United States Patent [19]

Esfandiary

[11] Patent Number: 4,929,008
[45] Date of Patent: May 29, 1990

[54] IMPACT ABSORBER FOR VEHICLES

[76] Inventor: Rahman A. Esfandiary, 13148 Victory Blvd., Van Nuys, Calif. 91401

[21] Appl. No.: 309,849

[22] Filed: Feb. 14, 1989

[51] Int. Cl.⁵ .................. B60R 19/18; B60R 19/03; B60R 19/34; F16F 7/12
[52] U.S. Cl. .................................. 293/108; 188/376; 267/139; 267/116; 293/120; 293/133; 293/142
[58] Field of Search .................. 188/371–377, 188/381, 129, 280; 267/139–140, 35, 259, 33, 34, 152, 116; 213/221, 223; 293/133, 107–110, 120–122, 132, 134–137, 155; 256/13.1; 404/6–10; 74/492; 280/777

[56] References Cited

U.S. PATENT DOCUMENTS

| 955,624 | 4/1910 | Welton | 293/122 |
|---|---|---|---|
| 2,811,385 | 10/1957 | Butler | 188/376 X |
| 2,837,176 | 6/1958 | Dropkin | 188/375 |
| 3,203,723 | 8/1965 | Montenare | 267/116 X |
| 3,444,962 | 5/1969 | Lech | 188/375 X |
| 3,564,688 | 2/1971 | De Gain | 74/492 X |
| 3,656,366 | 4/1972 | Somero | 74/492 |
| 3,697,108 | 10/1972 | Diener | 293/133 |
| 3,715,114 | 2/1973 | Thorsby et al. | 267/140 |
| 3,734,554 | 5/1973 | Schwabenlender | 267/140 X |
| 3,741,560 | 6/1973 | Schaller | 267/140 X |
| 3,747,968 | 7/1973 | Hornsby | 293/110 |
| 3,747,969 | 7/1973 | Diener | 293/133 |
| 3,801,087 | 4/1974 | Akaike et al. | 293/134 X |
| 3,841,683 | 10/1974 | Toro | 293/136 X |
| 3,848,736 | 11/1974 | Eshelman | 293/107 X |
| 3,862,669 | 1/1975 | Lindbert et al. | 188/376 X |
| 3,863,589 | 2/1975 | Guienne et al. | 293/136 X |
| 3,899,047 | 8/1975 | Maeda et al. | 188/376 X |
| 3,904,182 | 9/1975 | Allinquent et al. | 293/134 X |
| 3,961,818 | 6/1976 | Roth, Jr. | 293/137 X |
| 3,968,862 | 7/1976 | Gorges et al. | 293/133 X |
| 4,102,217 | 7/1978 | Yamamoto et al. | 188/376 |
| 4,190,276 | 2/1980 | Hirano et al. | 188/376 X |
| 4,426,109 | 1/1984 | Fike, Jr. | 188/376 X |
| 4,531,619 | 7/1985 | Eckels | 188/371 |
| 4,679,837 | 7/1987 | Bayer et al. | 293/132 X |
| 4,787,658 | 11/1988 | Harris, Jr. | 293/107 |
| 4,823,923 | 4/1989 | Moyer | 188/375 X |

FOREIGN PATENT DOCUMENTS

| 2441557 | 3/1976 | Fed. Rep. of Germany | 293/107 |
|---|---|---|---|
| 0678223 | 8/1979 | U.S.S.R. | 188/377 |

Primary Examiner—Douglas C. Butler

[57] ABSTRACT

An impact absorber is disclosed herein having a single or a pair of box-beam inflatable members arranged in guided sliding relationship. Elongated slots and shear bolts cooperate to releasably couple the inflatable members together so as to absorb shock prior to shearing. A resilient inflatable block is carried on the forward terminating end of one beam member while a resilient pad is carried on the terminating end of the other beam member in alignment to interfere with the sliding movement of the first member. The various impact-absorbing elements are arranged in a series for sequential actuation upon application of an impact. The inflatable block absorbs shock first, followed by the shear bolts and finally the resilient pad.

2 Claims, 1 Drawing Sheet

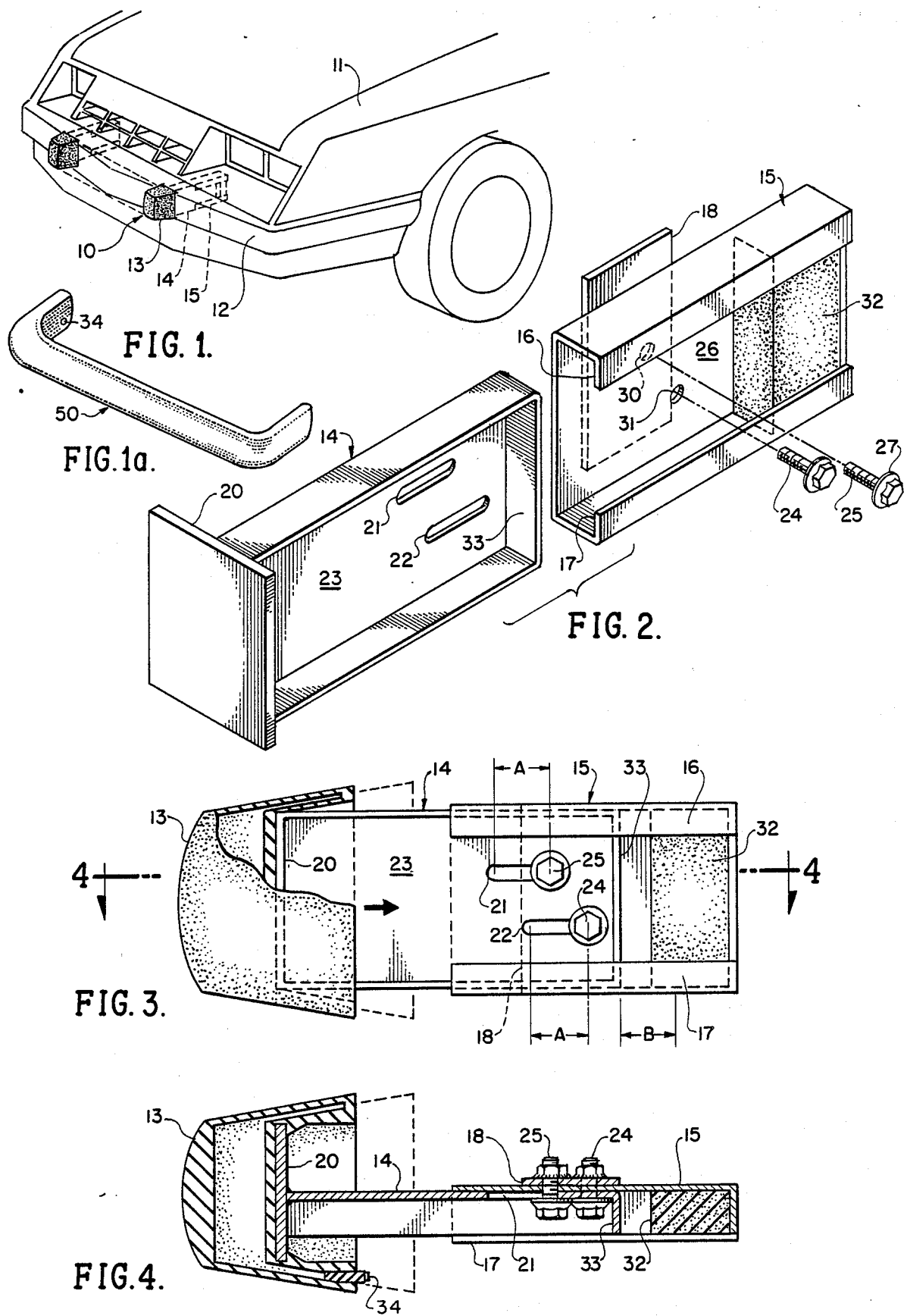

IMPACT ABSORBER FOR VEHICLES

BACKGROUND OF THE INVENTION

1. Field of the Invention

The present invention relates to vehicle safety devices and more particularly, to a novel impact absorber means having a plurality of impact absorbent elements arranged to progressively operate as the forces of impact increase.

2. Brief Description of the Prior Art

In the past, it has been the conventional practice for all motor vehicles to be provided with bumpers intended to withstand low impact forces. However, problems and difficulties have been encountered with such bumpers that stem largely from the fact that the bumpers are usually provided with expensive chrome surfaces that not only are easily marred but may be readily dented upon impact, and these bumpers do not absorb a sufficient amount of shock upon high impact to prevent subsequent damage to the vehicle. Some attempts have been made to overcome these problems by providing shock absorbing resilient caps on hook members which are directly attached to the bumper while other attempts have been made to provide absorbent materials within the bumper and its attachment to the chassis of the vehicle whereby impact shocks are readily absorbed. Still further difficulties have been encountered with these prior attempts since they are expensive, difficult to install and are limited to a relatively low range of impact forces.

Therefore, a long standing need has existed to provide an impact absorber for vehicles which not only absorbs and transmits loads to the chassis but which will operate within a wide range of impact load forces. The invention incorporates a plurality of shock-absorbing elements in a series, such as a yieldable inflatable member, a linear movable support beam and an impact cushion

SUMMARY OF THE INVENTION

Accordingly, the above problems and difficulties are obviated by the present invention which provides a novel impact absorber means for automotive vehicles which comprises a pair of members which are slidably related to one another and which are held in releasable position by a slotted and shearable bolt arrangement. Preferably, the members are of box-like construction and are arranged so that adjacent ends are releasably held together by the slot and shearable bolt arrangement whereby collapsing of the two members with respect to one another is frictionally resisted until the limits of the slot have been reached whereupon shearing of the bolts occurs. The terminating end of the first member is provided with a resilient cap or block adapted to initially absorb impact loads prior to actuation of the sliding movement between the members. The second member includes a compressible pad of resilient material located in its end opposite to its end in sliding relationship with the first member that constitutes another shock absorbing means intended to be encountered by the terminating end of the first member after a predetermined distance has been travelled by the first member during the shock or impact loading sequence. Means are provided for hanging or supporting the shock absorbing device of the present invention from an existing chassis of an automobile so that it is in position to receive impact via the conventional bumper.

Therefore, it is among the primary objects of the present invention to provide a novel shock absorbing means for use in combination with a vehicle bumper so that a wide range of impact loads can be transferred through the bumper to the chassis of the vehicle.

Another object of the present invention is to provide a novel shock absorbing device that is capable for retrofit onto a variety of conventional vehicles so that impact forces are readily absorbed or transmitted to the chassis of the vehicle.

Another object of the present invention is to provide a novel vehicle bumper impact absorbing means which will minimize damage to the vehicle from collisions within a wide range of low speeds and which will substantially minimize the cost of such damages.

Still a further object of the present invention is to provide a novel bumper impact absorber for automotive vehicles which enhances the overall safety of the vehicle and which can be readily installed on a variety of motor vehicles inexpensively.

Yet another object of the present invention is to provide a novel automotive shock absorbing device for use in combination with the bumper of the vehicle that can be readily produced, packaged and sold in kits for installation onto the vehicle after original manufacture of the vehicle.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view of a motor vehicle incorporating the inventive bumper shock absorbers of the present invention;

FIG. 1a is a front view of the inventive bumper with a pneumatic valve.

FIG. 2 is an enlarged exploded view, in perspective, showing the novel shock absorbing means of the present invention as employed in the vehicle in FIG. 1;

FIG. 3 is a side elevational view of the shock absorbing means shown in FIG. 2; and FIG. 4 is a longitudinal cross-sectional view of the shock absorbing means shown in FIG. 3 as taken in the direction of arrows 4—4 thereof.

DESCRIPTION OF THE PREFERRED EMBODIMENT

Referring to FIG. 1, the novel shock absorbing means of the present invention is indicated in the general direction of arrow 10 wherein the apparatus is mounted on a conventional vehicle 11 having a standard bumper 12. The means has an impact receiving inflatable cap or block 13 which outwardly projects from the front of the bumper 12. A pair of such shock absorbing means is illustrated; however, only a single shock absorbing means may be used, as is shown in broken lines. The means is identical in construction and operation. Also, it is to be understood that the shock absorbing means may be placed in combination with the front bumper 12 or rear bumper of the motor vehicle.

The inflatable cap is composed of a shock absorbing material such a resilient plastic, rubber or the like. The cap or block protrudes forwardly of the front face of the bumper 12 and is fixed on the end of a first member 14 which is arranged in sliding relationship with respect to a second member 15 that is coupled to the front chassis of the vehicle 11. The opposing ends of the members are arranged in sliding relationship so that member 14 is capable of moving towards the member 15 under impact or load against the cap or block 13.

Referring in detail to FIG. 2, the first and second members 14 and 15 respectively are illustrated as being of box-like construction wherein the opposing end of member 14 is slidably disposed within the channel elements 16 and 17 of the member 14. The member 15 is mounted to the chassis of the vehicle 11 by means of a hanger 18. Other mounting arrangements are envisioned depending on the model or type of vehicle to which the device or apparatus is being attached.

The end of member 14 opposite from its end slidably received within the channels 16 and 17 is provided with an attachment plate 20 about which the resilient cap or block 13 is formed. For clarification purposes, the block or cap is not illustrated in FIG. 2 so that the plate can be clearly identified. Preferably, the plate is of a square or rectangular configuration so that a periphery of substantial length is provided for attachment to the cap or block such as by means of molding or the like. The square configuration also provides corners on the plate which assists in embedding the plastic or rubber-like material about the end of member 14. Also, it can be seen in FIG. 2 that the member 14 is provided with a pair of elongated slots identified by numerals 21 and 22 respectively that are formed in a back plate 23 of the member 14. A pair of shear bolts 24 and 25 couple the inserted end of member 14 with the member 15 so that the respective members are joined together. To achieve joining, it is to be noted that member 15 includes a pair of offset holes in its back plate 26 for accommodating passage of the end of the bolts 24 and 25. Suitable nuts are carried on the ends of the bolts to achieve fastening. Also, it is to be noted that each of the respective bolts 24 and 25 includes a washer 27 that separates the head of the bolt from the opposing surface of the back plate 23. The slots 21 and 22 carried on back plate 23 are offset from one another wherein slot 21 is ahead of the slot 22. The same relationship is followed with respect to the holes, identified by numerals 30 and 31 carried on the back plate 26 of member 15. The bolts 24 and 25 are tightened so that the shanks of the bolts are at the front end of the slots 21 and 22 and are tightened so that a certain amount of friction is encountered in the event an impact is experienced by member 14. Upon reaching a level of resistance, member 14 will overcome the frictional resistance of the bolts and slide rearwardly with the shank of the bolt 24 and 25 sliding through the slots. Should the impact be of an extreme nature, the bolts 24 and 25 will reach the end of the slots and will shear, causing additional resistance and shock absorbing benefits.

It is also to be noted in FIG. 2 that the end of member 15 opposite from its end slidably receiving the end of member 14 is provided with a resilient pad 32 which may be of one-piece construction or may be of a layered construction of resilient pieces such as slabs of tire tread or the like. Should the impact be of sufficient strength to cause the end of member 14 to travel through the channels of member 15, the end will come into contact with the pad 32 that operates as an additional shock absorbing means. The pad is disposed in such a manner that impact between the end of member 14 and the pad will occur before the shank of the bolts 24 and 25 will be sheared by engagement with the end of the slots 21 and 22.

Referring now in detail to FIG. 3, it can be seen that the cap or block 13 initially receives the impact during a collision. Therefore, the cap or block will absorb shocks in the range of approximately an impact encountering one to two miles an hour. However, an impact within the range of two-four miles an hour will cause the member 14 to slide through the member 15 within the confines of the channels 16 and 17. This sliding is resisted by the frictional engagement of the bolts 24 and 25 holding the respective members 14 and 15 together Therefore, a second shock absorbing element is defined by the frictional engagement of the bolts with the respective members as the member 14 moves through the member 15. This movement is indicated by the letters A. However, should additional impact forces be encountered which would be approximately around the five mile an hour range, the end of member 14, which is identified by numeral 33, will engage with the pad 32 and a third shock absorbing means is encountered. When the end 33 travels through a portion of the pad 32 for a distance indicated by B, the shank of bolts 24 and 25 will be sheared by the end of the slots 21 and 22 which offers still increased resistance and, therefore, shock absorbing benefits. Consequently, the low impact shock absorbing is achieved by the resilient cap or block 13 followed by additional shock absorbing characteristics as the member 14 slides with respect to member 15 to encounter the frictional resistance of the tightened bolts constituting the second shock absorbing means. As the member 14 further progresses or travels with greater impact, the end plate 33 will encounter the pad 32 which constitutes a third shock absorbing portion of the invention and further travel will cause the shearing of the bolts constituting a fourth shock absorbing portion of the overall device.

Therefore, it can be seen that in the overall device, the shock absorbing characteristics are achieved by provision of four separate elements, all of which come into play in a sequence depending upon the amount of impact encountered. The impact absorbed by the resilient cap or block 13 is in a first speed regime or range while the frictional encounter of the member 14 with respect to the member 15 is a second component of the shock absorbing characteristic of the device. The third characteristic is encountered when the plate 33 impacts with the pad 32 while the fourth component resides in the shearing of the bolts 24 and 25.

Referring now in detail to FIG. 4, it can be seen that the cap or block 13 is embedded about the plate 20 so that it is firmly attached or carried on the exposed end of the slide member 14. It can also be seen that the opposite end of slide member 14 from its end carrying the plate 20 is provided with an impact plate 33 adapted to encounter with the pad 32. Not only do the channels 16 and 17 assist in guiding the sliding movement of member 14 with respect to member 15, but the impact plate 33 also assists in the guiding function since its width substantially occupies the opening in the channels through which the member 14 slides. Furthermore, the width of the upper and lower flanges of the box-like construction of member 14 assists in guiding member 14 during the sliding movement. In both FIGS. 3 and 4, the solid line showing of the cap or block 13 represents the at-rest condition of the device while the dotted line position illustrates movement of the member 14 upon impact to the block or cap 13.

A feature of the invention resides in the fact that the members 14 and 15 may be provided in a kit form for sale in stores to the automotive after market. The device need not be put on original manufactured automobiles since the member 15 may be readily coupled to the chassis of an existing vehicle by any suitable means. The bolts 24 and 25 not only serve as a means for resistantly attaching the members 14 and 15 together but also serve as a mounting means whereby the entire apparatus or device may be coupled to the chassis of the automobile. Such an attachment can be on the front bumper or the rear of the vehicle. In other instances, it is to be understood that the bumper and the cap or blocks may be incorporated as a single unit so that the bumper is directly carried on the member 14. The device may also be used separately wherein holes or openings can be provided in the bumper through which the caps or blocks 13 can project.

The inflatable cap or block is provided with a pneumatic valve 34 for introducing pressurized air thereto. The valve stem extends outwardly from the back of the cap or block for ready access in order to couple with a pressurized air supply.

FIG. 1a shows an elongated inflatable bumper 50 having an air valve 34 located in the rear. The bumper is similar to the blocks or bumper elements 13 in that both are inflatable and are mounted at the front or rear of the vehicle either by conventional mountings to the chassis or by the shear and cushion structure shown in FIGS. 2-4.

The bumper 50 is illustrated in broken lines in FIG. 1 and includes an interior chamber for holding a supply of air for cushioning purposes.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An impact absorber for vehicles comprising the combination of:
    a vehicle;
    bumper means carried on said vehicle;
    said bumper means includes an elongated bumper outwardly supported from said vehicle by a pair of spaced-apart members;
    said bumper is an elongated inflatable element having a central chamber occupied by pressurized air;
    an air valve operably carried on said inflatable element in gated communication with said central chamber for passing pressurized air into said chamber;
    each of said spaced-apart members constituting an elongated collapsible member having impact absorbing means and rate of collapse means midway between its opposite ends adapted to irreversibly collapse at a rate upon impact within a predetermined impact range;
    each of said elongated members further including a pair of elongated member sections having their respective adjacent ends overlapped and yieldably coupled together to define said elongated member;
    frictional release means yieldably joining said overlapped member section ends together;
    said impact absorbing means includes a resilient material of greater resiliency than said member section carried on each end of said elongated member sections opposite to their overlapped ends;
    one of said resilient materials being a cap fixed to said member section exteriorly thereof and the other one of said resilient materials being a pad internally carried by said member in direct interfering alignment with said other member section;
    said frictional release means includes a pair of elongated, spaced-apart slots provided in one member section and a pair of holes provided in the other member section adjacent with and in alignment with said slots and holes respectively;
    said bolt fasteners characterized as tightened with a predetermined torque sufficient to hold said member sections together and being yieldable to permit sliding of one member section respective to said other member section upon increase of impact force beyond said impact range; and
    said bolt fasteners further characterized as shear off bolts breakage upon attainment of impact forces beyond said impact range of permanent collapse.

2. The invention as defined in claim 1 wherein:
    said various impact absorbing elements being arranged in a series for sequential actuation upon application of impact with said inflatable bumper absorbing shock first, followed by said shear off bolts and then said resilient pad.

* * * * *